(12) United States Patent
Kunken et al.

(10) Patent No.: US 9,989,080 B1
(45) Date of Patent: Jun. 5, 2018

(54) SUBSTRATE ANCHORING DEVICE

(71) Applicants: Lee Kunken, Healdsburg, CA (US); Steve Donaldson, Santa Rosa, CA (US)

(72) Inventors: Lee Kunken, Healdsburg, CA (US); Steve Donaldson, Santa Rosa, CA (US)

(*) Notice: Subject to any disclaimer, the term of this patent is extended or adjusted under 35 U.S.C. 154(b) by 0 days. days.

(21) Appl. No.: 14/929,417

(22) Filed: Nov. 2, 2015

(51) Int. Cl.
F16B 13/08 (2006.01)
F16B 13/00 (2006.01)
F16B 15/06 (2006.01)
E04B 1/41 (2006.01)
E04B 1/00 (2006.01)

(52) U.S. Cl.
CPC ........ F16B 13/0808 (2013.01); F16B 13/002 (2013.01); F16B 15/06 (2013.01); *E04B 1/003* (2013.01); *E04B 1/40* (2013.01)

(58) Field of Classification Search
CPC ................. F16B 13/0808; F16B 13/0833
USPC .......................................... 411/347, 340–342
See application file for complete search history.

(56) References Cited

U.S. PATENT DOCUMENTS

| 2,408,560 | A | * | 10/1946 | Keehn | B25B 31/005 269/232 |
| 3,168,850 | A | * | 2/1965 | Tennican | F16B 13/0808 411/342 |
| 3,534,650 | A | * | 10/1970 | Kubokawa | F16B 19/109 24/453 |
| 3,933,390 | A | * | 1/1976 | Barrett | B63C 7/16 294/66.1 |
| 4,315,708 | A | * | 2/1982 | Liebig | F16B 13/0833 411/341 |
| 4,675,972 | A | * | 6/1987 | Bappert | B23B 49/005 156/92 |
| 6,709,212 | B1 | * | 3/2004 | Lauchner | F16B 13/0808 411/342 |
| 8,132,435 | B2 | * | 3/2012 | Thomas | E05B 65/0021 70/95 |
| 9,115,744 | B1 | * | 8/2015 | Bulow | F16B 39/00 |
| 2008/0003077 | A1 | * | 1/2008 | Anderson | F16B 19/109 411/347 |

* cited by examiner

*Primary Examiner* — Flemming Saether
(74) *Attorney, Agent, or Firm* — Knobbe, Martens, Olson & Bear, LLP

(57) ABSTRACT

An anchoring device for a attaching a plurality of substrates when only one side of the substrates is accessible.

14 Claims, 5 Drawing Sheets

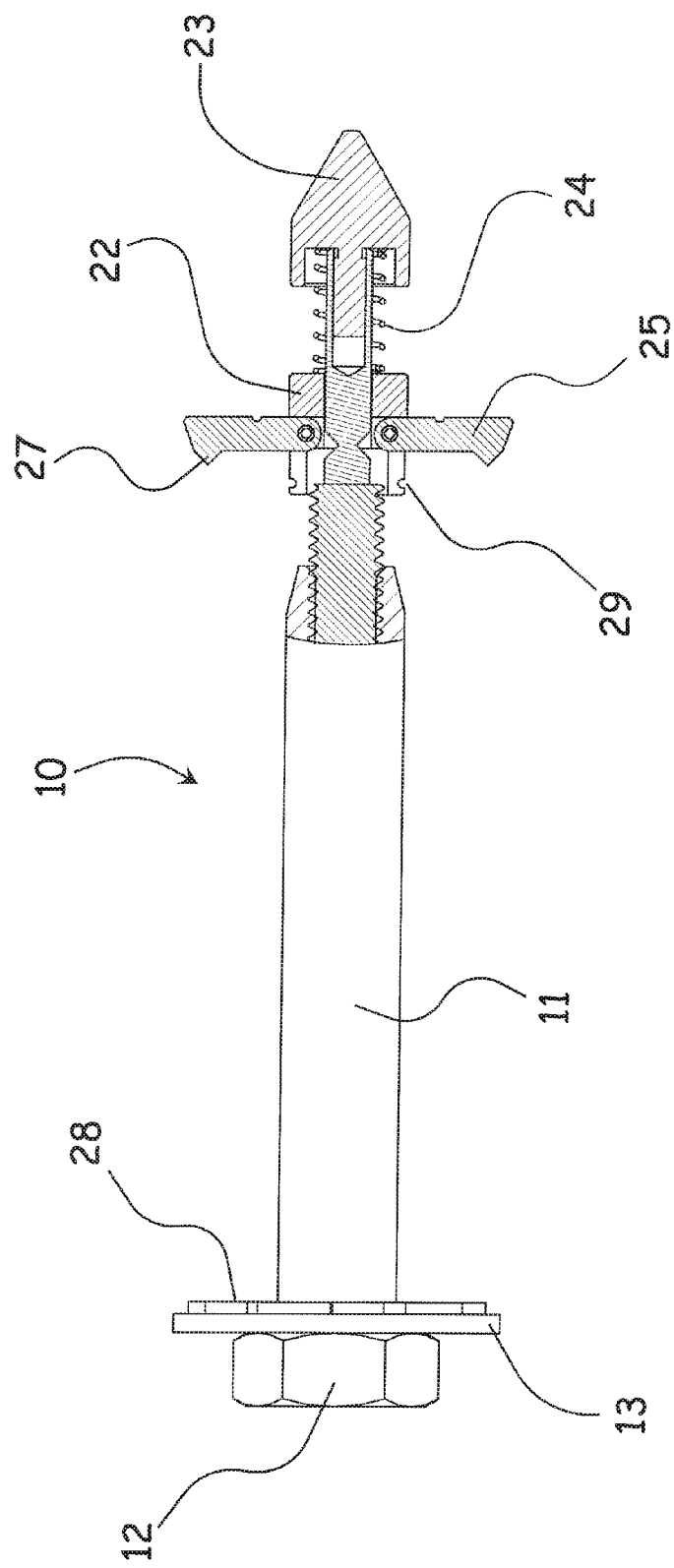

SUBSTRATE ANCHORING DEVICE

FIELD OF THE INVENTION

This invention relates generally to the field of devices for attaching a plurality of substrates and more particularly to devices for attaching a plurality of substrates where only one side of a first substrate is accessible.

BACKGROUND OF THE INVENTION

The invention was conceived in relation to the construction arts and in particular in relation to the addition of wooden decks to houses. Decks are extremely popular on new homes and are becoming extremely popular as add-ons to older homes. The National Association of Home Builders estimates that wood decks are included in nearly one-third of new homes, and are the most popular do-it-yourself construction project. A vast number of decks built in the last 30 years are in need of re-building, and many of these need to be redesigned with improved technology to make them safer. Deck collapses are not uncommon, and most deck collapses can be attributed to failure of the anchoring system anchoring the deck to the associated structure.

A common method for attaching a deck to an associated structure is nailing a deck beam to the rim joists of the structure. This method, however, is prone to failure over time. While nails generally have sufficient tensile strength to resist the vertical shearing force created by the weight of the deck and its contents, nails do not provide great strength laterally and are prone to pullout. Wood screws and lag screws can be used in place of nails to provide additional lateral strength, however screws are also prone to failure, particularly when there is localized rot or other decay proximate to the screw, or aging of the substrate causes enlargement of the hole around the screw.

A superior method for attaching a deck to an associated structure utilizes a bolt and nut assembly. Generally this method involves placing a bolt fitted with a washer into a hole which has been pre-drilled through both the deck beam and the rim-joist. The bolt is then fitted with a second washer and nut on the back side of the rim joist. The nut and second washer provide substantial resistance against pull-out forces even when there is localized rot common to older decks. Nevertheless, despite the superiority of the bolt and nut assembly, lack of access to the backside of the rim joist in many applications makes the use of the bolt and nut assembly impractical or even impossible.

Many attempts have been made to provide a device for joining two or more substrates which device provides high pull-out resistance and which can be deployed when the substrates can be accessed only from one side. For example, in U.S. Pat. No. 3,017,800, Cohen teaches an anchor bolt with an expanding sleeve particularly suited for joining two asbestos panels. The anchor bolt taught by Cohen however, requires a bolt-sleeve made from a compressible, flexible material which makes it ill-suited for heavy-duty applications such as joining a deck to a home.

In U.S. Pat. No. 8,439,613, Prentice teaches a fastener apparatus that features projecting locking members that extend and retract when a central drive shaft is rotated. To use this fastener, however, an internal shaft must be rotated to extend locking members before the fastener apparatus may be tightened.

In U.S. Pat. No. 3,241,420, Passer La Roy teaches a hollow wall fastening receptacle which can be used in combination with a screw to secure an object to a wall. This fastening receptacle requires that a hole be drilled through the wall for deployment of the device before the object can be attached to the fastening receptacle via a screw.

Thus, there is a need for a durable device for easily attaching a plurality of substrates together when only one side of the substrates is accessible. It is therefore, an object of this invention to provide a fastening device for joining substrates which may be deployed when only one side of the substrates is accessible.

A further object of this invention is to provide a fastening device which can be secured using a single tool.

A further object of this invention is to provide a fastening device which can be deployed through a substrate without pre-drilling a hole through the substrates.

BRIEF SUMMARY OF THE INVENTION

It is an object of this invention to provide a fastening device for joining a plurality of substrates which provides for high pull-out resistance, and simplicity of use. To achieve the forgoing and other objects in accordance with the purpose of the invention, an internally threaded shoulder bolt is used in combination with a plurality of deployable stop bars. The deployable stop bars are hingedly attached to a slide collar which is slidably mounted on a slide bolt. The slide bolt is threaded to work in conjunction with the internal threads of the shoulder bolt. A spring is provided to bias the stop bars to positions which are substantially perpendicular to the slide bolt. When the fastening device is in its undeployed state, a retaining ring is mounted on the slide collar to hold the stop bars in positions where each stop bar is substantially parallel to the slide bolt.

To secure the fastening device, the fastening device is driven through the substrates to be joined. The fastening device may be driven through pre-drilled holes in the substrates. In one embodiment the fastening device has a rigid and pointed tip and may be pushed or hammered through the substrates. In another embodiment the fastening device has a drill tip and may be driven though the substrates by rotation of the fastening device. As the fastening device is driven through the substrates, the retaining ring is pressed against the first substrate and is urged off of the slide collar, allowing the spring to bias the stop bars towards a position perpendicular to the slide bolt. When the slide collar and stop bars emerge on the opposite side of the substrates, the stop bars are deployed. Once the stop bars are deployed, the shoulder bolt is rotated causing the slide bolt to move inwardly into the hollow sleeve of the shoulder bolt and compressing the substrates between the stop bars and a flange on the shoulder bolt. The shoulder bolt is rotated until a desired torque is reached.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

BRIEF DESCRIPTION OF THE SEVERAL VIEWS OF THE DRAWINGS

In the accompanying drawings in which is shown one of the various possible embodiments of the subject invention.

FIG. 5 is a cross section of the anchor portion of the fastening device engaged in the shoulder bolt portion.

DETAILED DESCRIPTION OF THE INVENTION

Figure 2:
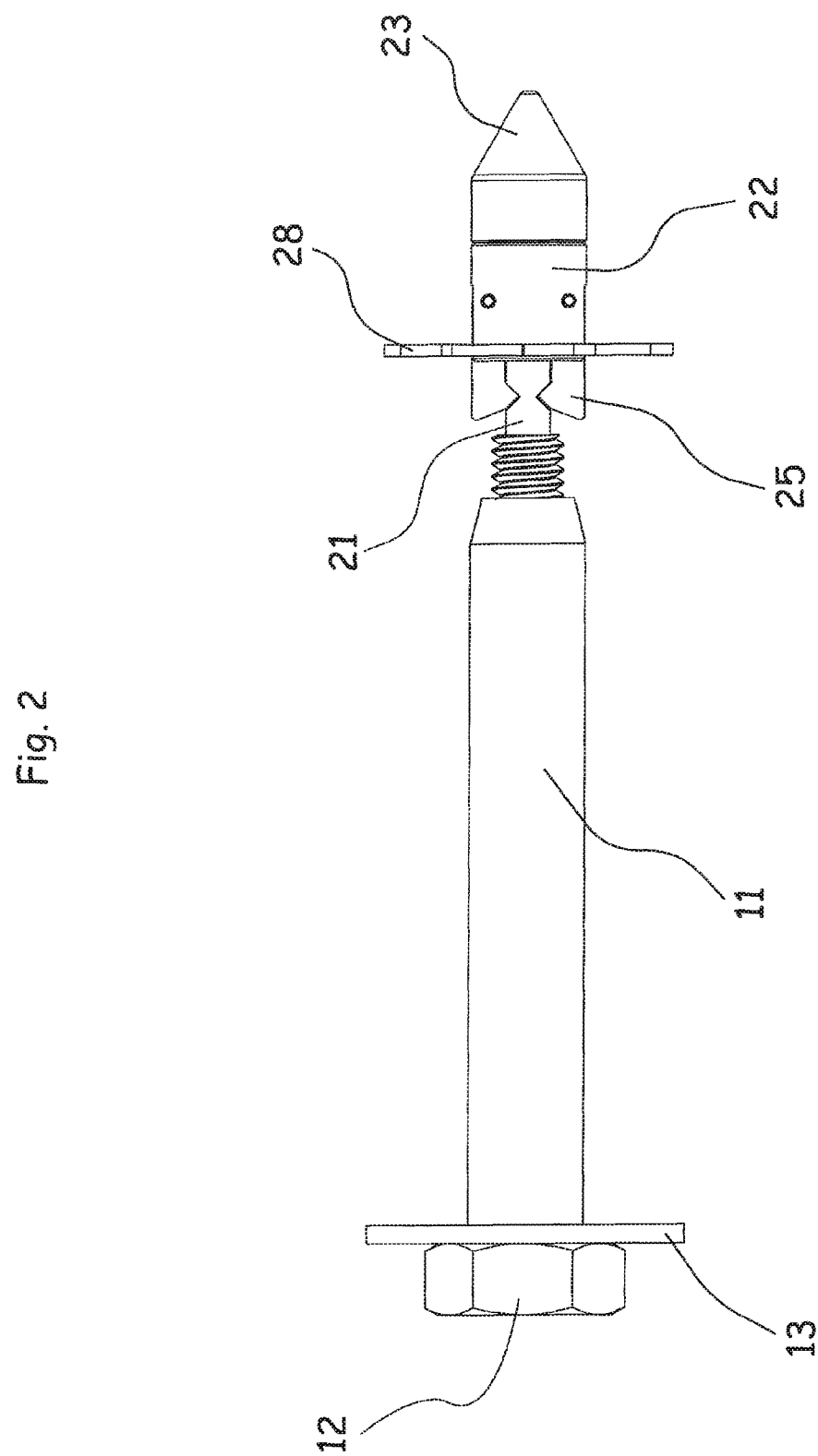
FIG. 2 is a perspective of the fastening device in its undeployed state.
Figure 3:
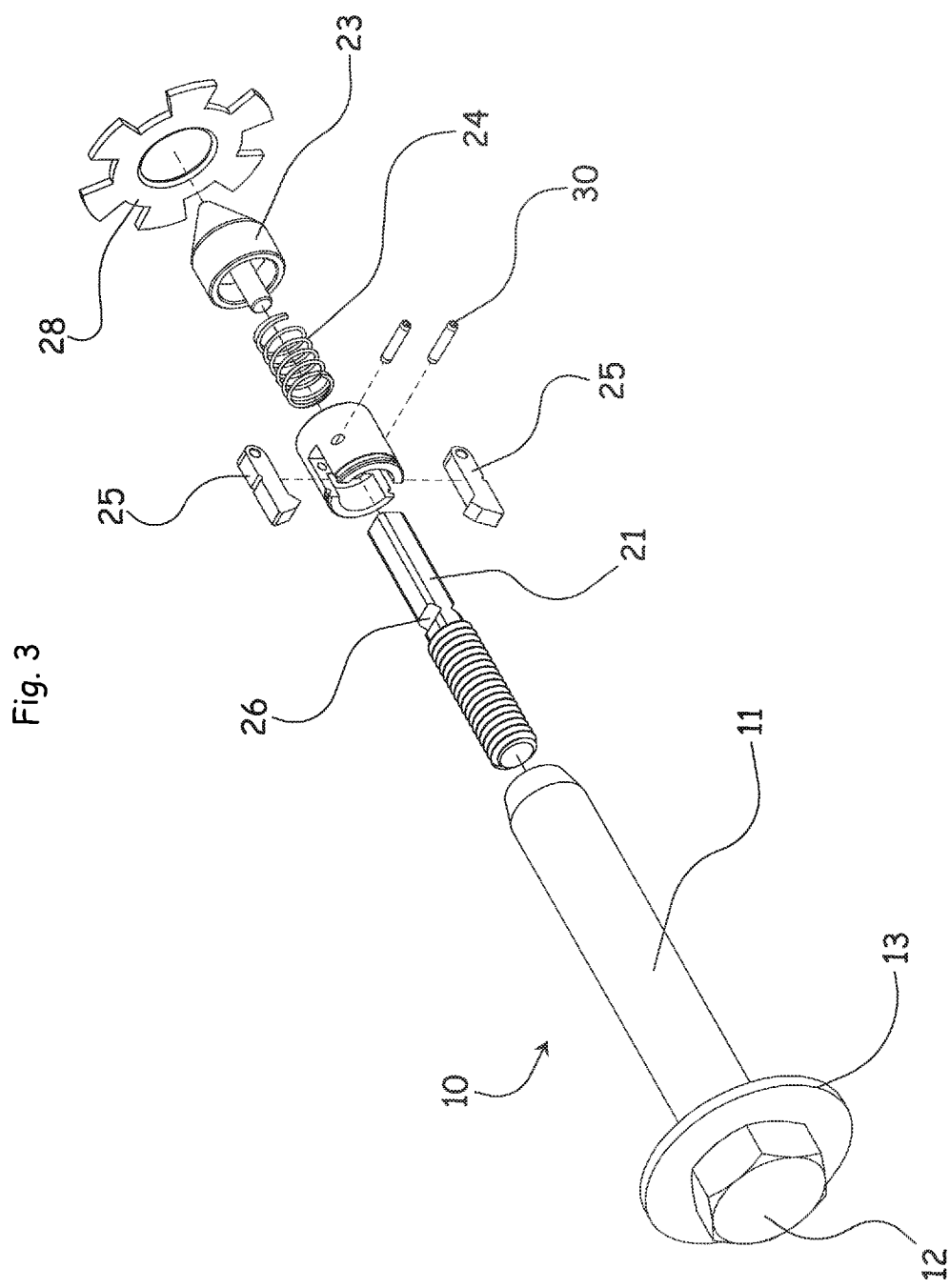
FIG. 3 is an exploded view of the fastening device.

Referring initially to FIGS. 2 and 3, a fastening device 10 in accordance with the present invention is shown. The fastening device includes generally a shoulder bolt 10 and an anchor 20. The shoulder bolt has an internally threaded shaft 11 and a head 12, the diameter of the head being larger than the diameter of the shaft.

The anchor 20 comprises a slide bolt 21 which is threaded on a first end to work in conjunction with the internally threaded shaft 11. A second end of the slide bolt defines a plurality of slide bolt notches 26. A slide collar 22 is slidably disposed on a second end of the slide bolt 21 and a cap 23 is fixedly attached to the second end of the slide bolt 21. A spring 24 is disposed on the second end of the slide bolt between the cap 23 and the slide collar 22.

The anchor 20 further comprises a plurality of stop bars 25, hingedly attached to the slide collar 22. In a preferred embodiment, hinge pins 30 are utilized to hingedly attach the stop bars to the slide collar. The stop bars 25 are shaped to define substantially V-shaped projections 27 which are sized to fit within the slide bolt notches 26 defined in the second end of the slide bolt 21. When the stop bars 25 are disposed so that the projections 27 are within the slide bolt notches 26, the slide collar and the stop bars define a cylinder with an outer diameter substantially the same as the outer diameter of the internally threaded shaft 11.

The slide collar 22 defines a retaining ring groove 29 and each of the stop bars also define stop bar grooves 30 such that when the stop bars 25 are disposed so that the projections 27 are within the slide bolt notches 26 the grooves defined by the stop bars are aligned with the retaining ring groove 29 defined by slide collar 22. When the fastening device of the present invention is in its undeployed state, a retaining ring 28 is fitted within the retaining ring groove 29 and the stop bar grooves 30 to retain the projections 27 within the slide bolt notches 26 as shown in FIG. 2.

To secure the fastening device, the fastening device is first driven through the substrates to be joined. The fastening device may be driven through pre-drilled holes in the substrates. In one embodiment the cap 23 is rigid and pointed so that the fastening device may be pushed or hammered through the substrates. In another embodiment the cap is a drill and the fastening device may be driven through the substrates by rotation of the fastening device. As the fastening device is driven through the substrates, the retaining ring 28 is pressed against the first substrate 40 and is urged out of the retaining ring groove 29 and off of the slide collar 22. When the retaining ring 28 is removed from the slide collar 22 the stop bars 25 are permitted to rotate in relation to the slide collar 22 and the projections may disengage from the slide bolt notches 26. With the projections 27 disengaged from the slide bolt notches 26, the spring 24 biases the slide collar to slide directionally towards the shoulder bolt 10. As the slide collar 22 slides directionally towards the shoulder bolt 10 the stop bars 25 are biased towards a position perpendicular to the slide bolt 21. When the slide collar 22 and stop bars 25 emerge on the opposite side of the plurality of substrates, the stop bars 25 are deployed in a position substantially perpendicular to the slide bolt 21. FIG. 5 shows the fastening device with the stop bars 25 deployed.

Once the stop bars 25 are deployed, the shoulder bolt 10 is rotated causing the slide bolt 21 to move inwardly into the shaft 11 of the shoulder bolt 10, compressing the substrates between the stop bars 25 and a flange 13 on the shoulder bolt 10. The shoulder bolt 10 is rotated until a desired torque is reached.

Figure 1:
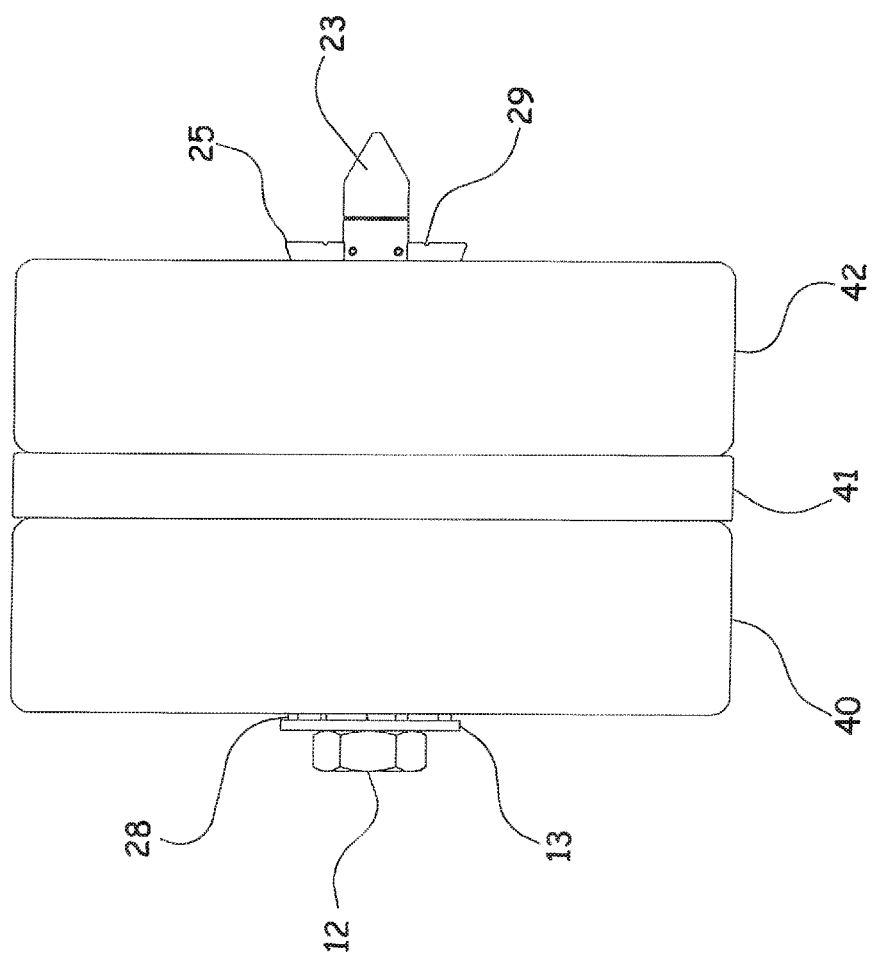
FIG. 1 is a perspective of the fastening device in its insertion position and fastening three substrates.
Figure 4:
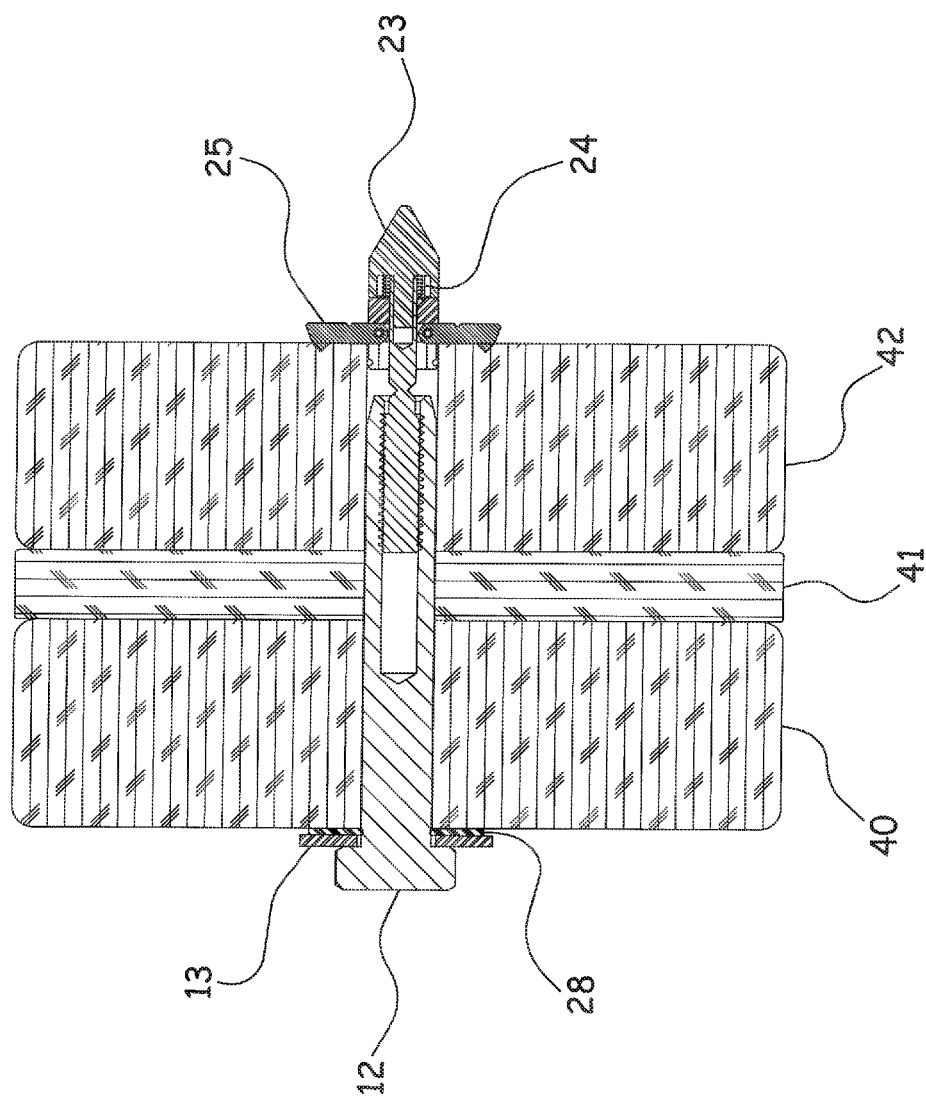
FIG. 4 is a cross-section of the fastening device fastening three substrates.

FIG. 1 shows the fastening device fastening a first substrate 40, a second substrate 41 and third substrate 42. The retaining ring 28 can be seen between the head 12 and the first substrate 40. The cap 23, the slide collar 22 and the stop bars 25 can be seen emerging from the third substrate. The operation of the fastening device is more clearly depicted in FIG. 4. The retaining ring can be seen between the head 12 and the first substrate 40. As the shoulder bolt 10 is rotated the internally threaded shaft 11 works with the threaded first end of the slide bolt 21 to draw the slide bolt directionally towards the head 12, compressing the spring 24 between the cap 23 and the slide collar 22 and compressing the substrates between the head 12 and the stop bars 25.

The present examples are to be considered illustrative and not restrictive, and the invention is not to be limited to the detail given herein, but may be modified within the scope of the appended claims.

What is claimed is:

1. A fastening device for fastening a plurality of substrates comprising:
    a shoulder bolt comprising a shaft having internal threads;
    an anchor, said anchor comprising a slide bolt with a first end and a second end wherein said first end is threaded and engageable with said internal threads of said shaft;
    a slide collar slidably disposed on said second end;
    a plurality of stop bars hingedly attached to said slide collar;
    a cap fixedly attached to said second end;
    a spring disposed on said second end disposed to bias said stop bars to a position substantially perpendicular to said slide bolt.

2. The fastening device of claim 1 wherein said spring is disposed between said slide collar and said cap.

3. The fastening device of claim 1 further comprising a retaining ring, said retaining ring removeably attached to said slide collar and capable of holding said stop bars in a position substantially parallel to said slide bolt.

4. The fastening device of claim 3 wherein said shoulder bolt comprises a hexagon shaped head and a flange.

5. The fastening device of claim 3 wherein said stop bars define substantially V-shaped projections and said slide bolt defines notches for accepting said projections.

6. The fastening device of claim 5 wherein said cap is rigid and pointed.

7. The fastening device of claim 5 wherein said cap is a drill bit.

8. The fastening device of claim 1 wherein said slide collar and said stop bars form a substantially hollow cylinder with an outer diameter substantially the same as the outer diameter of said shaft when said stop bars are in a position substantially parallel to said slide bolt.

9. The fastening device of claim 1 wherein said stop bars are hingedly attached to said slide collar with hinge pins.

10. A fastening device for fastening a plurality of substrates comprising:

a shoulder bolt comprising a shaft having internal threads;

an anchor, said anchor comprising a slide bolt with a first end and a second end wherein said first end is threaded and engageable with said internal threads of said shaft and said second end defines a plurality of notches;

a slide collar slidably disposed on said second end;

a plurality of stop bars hingedly attached to said slide collar wherein said plurality of stop bars define V-shaped projections;

a cap fixedly attached to said second end;

a spring disposed on said second end and biasing said stop bars to a position substantially perpendicular to said slide bolt;

a retainer ring removeably mounted on said slide collar and capable of holding said stop bars in a position substantially parallel to said slide bolt.

11. The fastening device of claim 10 further wherein said cap is substantially rigid and pointed.

12. The fastening device of claim 10 further wherein said cap is a drill bit.

13. The fastening device of claim 10 wherein said shoulder bolt comprises a hexagon shaped head and a flange.

14. A fastening device for fastening a plurality of substrates comprising:

a shoulder bolt comprising a shaft having internal threads, said shoulder bolt further comprising a hexagon shaped head and a flange;

an anchor, said anchor comprising a slide bolt with a first end and a second end wherein said first end is threaded and engageable with said internal threads of said shaft and said second end defines a plurality of notches;

a slide collar slidably disposed on said second end;

a plurality of stop bars hingedly attached to said slide collar wherein said plurality of stop bars define V-shaped projections capable of engaging said plurality of notches;

a substantially rigid and pointed cap fixedly attached to said second end;

a spring disposed on said second end and biasing said stop bars to a position substantially perpendicular to said slide bolt;

a retainer ring removably mounted on said slide collar and capable of holding said stop bars in a position substantially parallel to said slide bolt.

\* \* \* \* \*